United States Patent [19]

Montagu

[11] Patent Number: 4,655,543
[45] Date of Patent: Apr. 7, 1987

[54] MOUNT FOR ATTACHING AN OPTICAL ELEMENT TO A ROTATING SHAFT

[75] Inventor: Jean I. Montagu, Brookline, Mass.

[73] Assignee: General Scanning, Inc., Watertown, Mass.

[21] Appl. No.: 731,848

[22] Filed: May 8, 1985

[51] Int. Cl.$^4$ .............................................. G02B 26/10
[52] U.S. Cl. ..................................................... 350/6.6
[58] Field of Search ........................... 350/6.5, 6.6, 6.9; 411/83, 85, 42, 71, 24

[56] References Cited

U.S. PATENT DOCUMENTS

| | | |
|---|---|---|
| 1,798,572 | 3/1931 | Welton . |
| 2,205,474 | 6/1940 | Goeller .................................. 24/125 |
| 3,126,191 | 3/1964 | Holden .................................. 248/286 |
| 3,638,891 | 2/1972 | Schlosser ............................... 248/221 |
| 3,676,274 | 7/1972 | Matulis ..................................... 161/4 |
| 3,867,050 | 2/1975 | Pitner ..................................... 403/373 |
| 3,877,824 | 4/1975 | Jury ....................................... 403/174 |
| 4,316,648 | 2/1982 | Lissack .................................... 350/6.6 |
| 4,351,005 | 9/1982 | Imai et al. ............................... 350/6.6 |

OTHER PUBLICATIONS

Zimmerman, "Strain-Free Mounting Techniques for Metal Mirrors", *Optical Engineering*, Mar./Apr. 1981, vol. 20, No. 2, pp. 187–189.
Lipeles, "Design of Ultralightweight Mirror", *Technology Report*, Mar. 1984, pp. 26–36.

*Primary Examiner*—John K. Corbin
*Assistant Examiner*—Loha Ben

[57] ABSTRACT

A mount for attaching an optical element to a rotating shaft combines a first portion which bears the optical element and is sufficiently rigid to limit dynamic distortion of the optical element, a clamp portion spaced axially from the first portion for clamping the mount to the shaft using a force which causes mechanical distortion in the clamp portion, and a strain decoupling means connecting the first portion to the clamp portion and configured to transmit rotation of the shaft faithfully to the element, while isolating the mechanical distortion in the clamp portion from being transmitted axially to the first portion.

17 Claims, 9 Drawing Figures

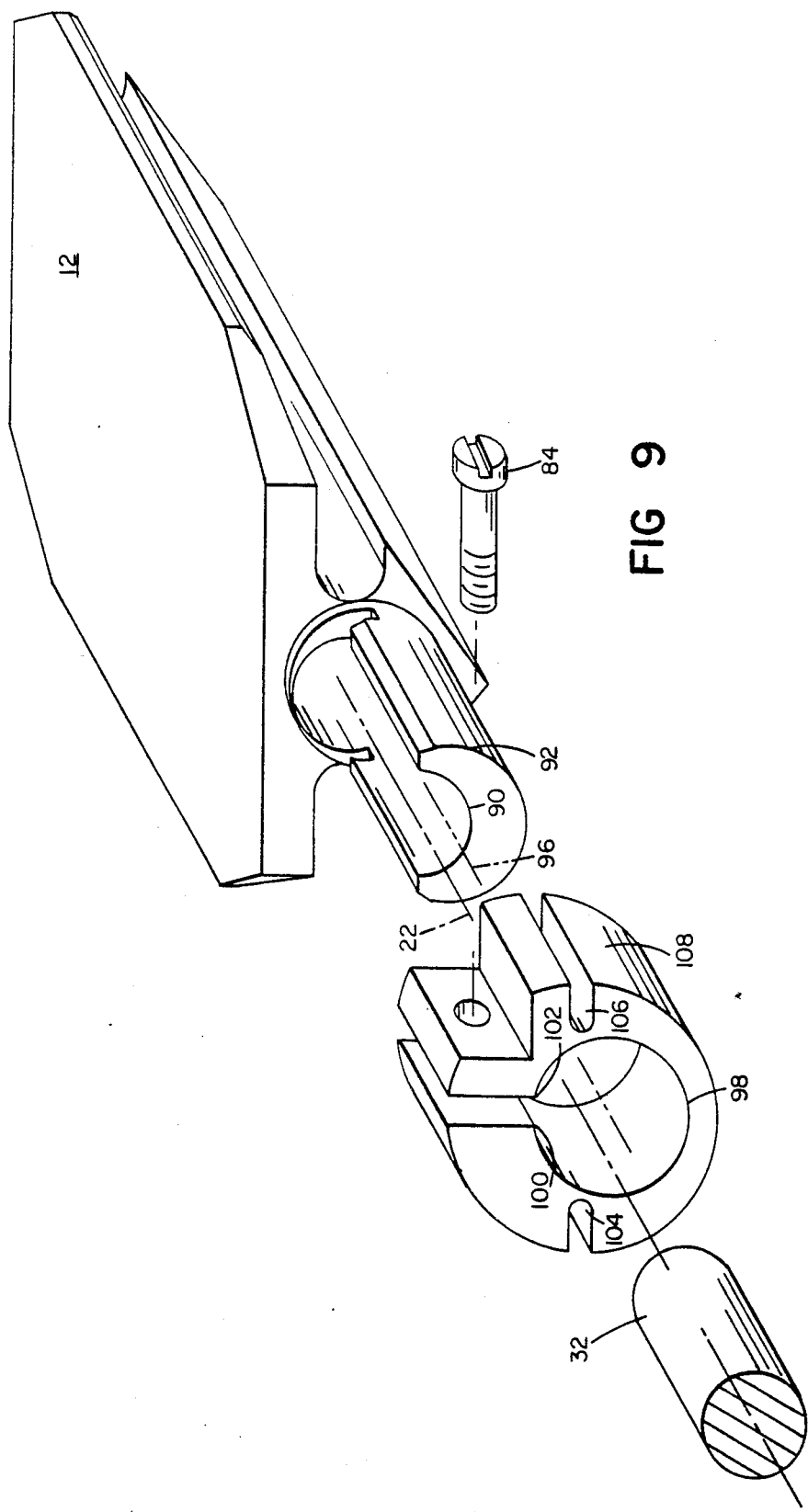

MOUNT FOR ATTACHING AN OPTICAL ELEMENT TO A ROTATING SHAFT

BACKGROUND OF THE INVENTION

This invention relates to mounting an optical element on a rotating shaft, for example, a mirror on the shaft of a galvanometer used for beam scanning.

Even very minor imperfections in the mounted position of the mirror and very minor deviations from flatness of the mirror (e.g., as small as fractions of a micron) can cause unacceptable distortions and inaccuracies in the position of the scanned beam on a surface one meter from the mirror.

Forming the mirror surface integrally with the metal mirror mount, for example by so called replication processes or diamond machining, aids in reducing distortion and mislocation of the mirror which might otherwise be caused by conventional bonding technigues or by differential expansion with change in temperature. Integral mirror/mounts also provide low inertia.

Clamping the mount on the galvanometer shaft can cause mirror distortion or misalignment of the mirror, as a result, for example, of the tolerance between the shaft diameter and the shaft clamp.

Zimmerman, "Strain-free Mounting Techniques for Metal Mirrors", Optical Engineering, March/April, 1981, Vol. 20, No. 2, pp. 187-189, suggests mounting metal mirrors so as to "isolate the mounting strain path from the mirror surface ... by appropriate geometry."

Lipeler, "Design of Ultralightweight Mirror," Laser Focus/Electro Optics, March, 1984, p. 26, proposes mounting a mirror so as "to spread the load, to avoid transmitting moments, and to make the mirror and its substructure thermally compatible."

SUMMARY OF THE INVENTION

The invention isolates the mechanical distortion imposed in the clamp of the mount axially by interposing a strain decoupling means between the clamp and the portion of the mount which bears the optical element so that rotation of the shaft is transmitted faithfully to the optical element, but mechanical distortion is isolated from being transmitted axially to the optical element.

The general feature of the invention is a mount which has a first portion that bears the optical element and is sufficiently rigid to prevent dynamic distortion of the optical element; a clamp portion for clamping the mount to the shaft using a force which causes mechanical distortion in the clamp portion; and strain decoupling means configured to enable motion of the shaft to be transmitted faithfully to the element while isolating the mechanical distortion in the clamp portion from being transmitted axially to the first portion.

Preferred embodiments of the invention include the following features. The strain decoupling means includes a rigid region that connects the first portion and the clamp portion through necked down regions that have smaller cross-sectional areas than the first portion and the clamp portion. The clamp portion has a bore for fitting over the shaft and is configured to grip the shaft by mechanical distortion. The clamp portion includes a clamp base, a pair of spaced-apart ears which can be drawn together to impart the mechanical distortion, and a relieved region for decoupling the mechanical distortion of the ears from the clamp base, with the strain decoupling means connecting only the clamp base to the first portion. The bore is larger than the shaft and is split to define a pair of edges on one side of the axis and an alignment surface on the opposite side of the axis so that the mechanical distortion causes the edges to force the shaft against the alignment surface. The clamp portion includes a sleeve that fits over the shaft and a collet that fits over the sleeve. The collet and sleeve both include ears and relieved areas that cooperate to decouple the mechanical distortion from the strain decoupling means. The sleeve has an inner wall for gripping the shaft and an outer wall (eccentric to the inner wall) that engages with the inner wall of the collet. In other embodiments, the collet is split to define a pair of edges on one side of the axis and the sleeve inner wall defines a corresponding alignment surface on the other side of the axis. The center of mass of the sleeve and collet are respectively offset from said axis for balance and to provide a stronger support for the alignment surface. The strain decoupling means includes a backbone spaced radially from the first portion and a cutaway region for connecting the backbone to the first portion. The cutaway region is of a smaller cross-section than the optical element. The optical element is in a plane parallel to but spaced apart from the shaft axis. The optical element is a planar mirror. The mount is balanced with respect to the axis. The clamp portion, first portion, strain decoupling means, and optical element are integrally formed.

The mount can be easily and securely attached to the shaft while minimizing mechanical distortion of the mirror. Proper alignment of the mirror surface relative to the axis is assured even though the shaft is smaller than the mount bore. Stresses resulting from clamping forces and deformations to accommodate diameter differences between the shaft and the mount bore are prevented from causing proportional strains in the first portion by having it connected through a strain decoupling means (a region of reduced cross-sectional area followed by a region of enlarged cross-sectional area, followed by another region of reduced cross-sectional area, finally followed by a region of enlarged cross-sectional area).

When the clamp region (of large cross-section) is subjected to bending forces, stress and strain are induced. The strains are transmitted to the necked down section, but the necked-down section can transmit maximum forces only egual to the product of its cross-sectional area times the strains. These forces are transmitted to a backbone portion (of large cross-section) where they cause strains inversely proportional to the ratio of its cross-sectional area to the cross-sectional area of the necked-down region. The strain and therefor the stress in the backbone portion are thus much lower than in the clamp portion. This process is repeated between the backbone and the first portion, reducing the strain in the mirror one more time.

The mirror surface can be ground easily because it is the most forward surface of the structure relative to the axis. The mount is balanced to reduce centrifugal forces that can cause wobbles and inaccuracies of motion. Rotation of the shaft is accurately transmitted to the mirror. In embodiments using a collet, the mount is easier to attach to the shaft.

Other advantages and features will become apparent from the following description of the preferred embodiment, and from the claims.

DESCRIPTION OF THE PREFERRED EMBODIMENTS

We first briefly describe the drawings.

DRAWINGS

FIGS. 8, 9 are exploded isometric views of two other embodiments.

STRUCTURE

Figure 1:
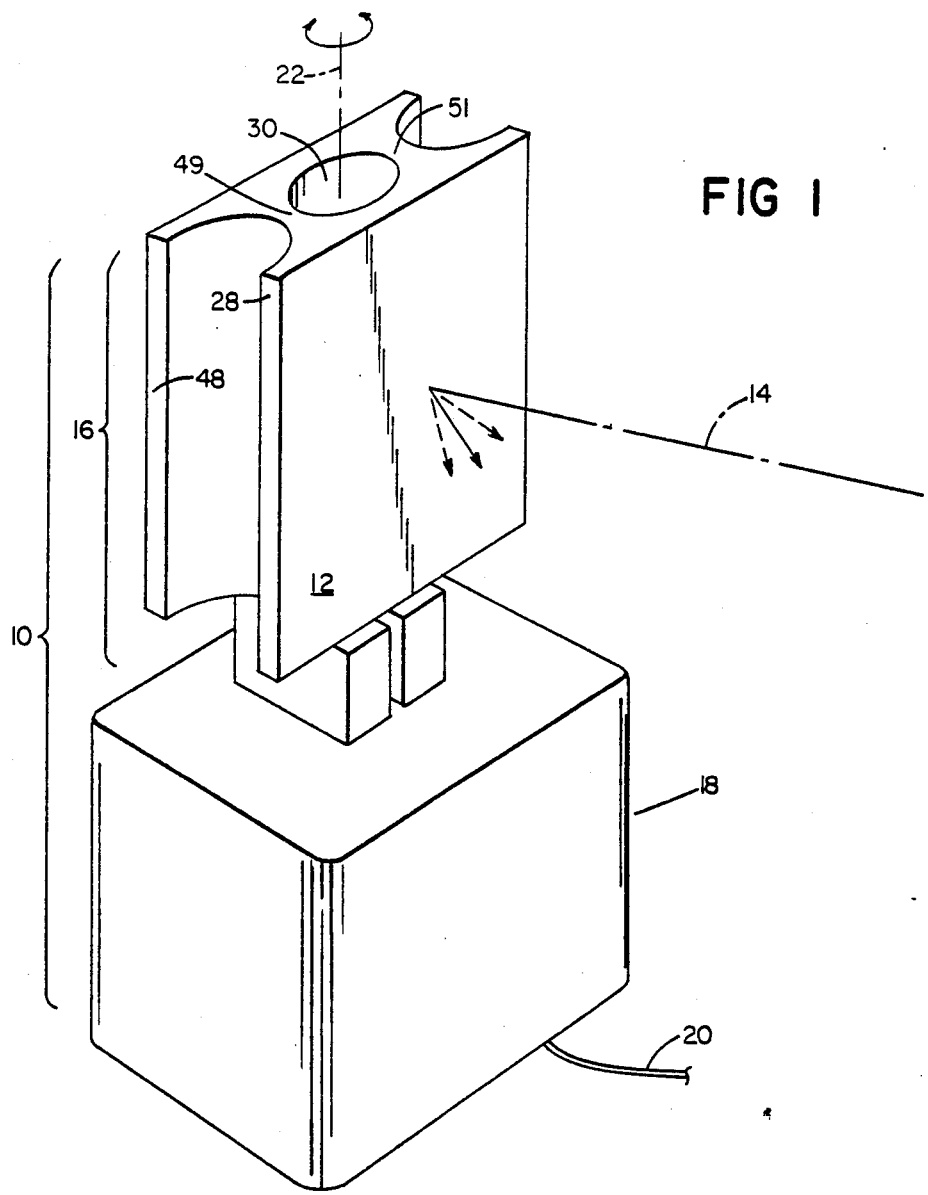
FIG. 1 is an isometric view of a scanner.

Referring to FIG. 1, in scanner 10 a flat mirror surface 12 receives a beam along axis 14 and reflects the beam. Mirror surface 12 is part of a mirror mount 16. Mount 16 is connected to the shaft (not shown) of a galvanometer 18, which is powered via cable 20 to rotate mount 16 back and forth about axis 22, causing scanning of the reflected beam in a plane perpendicular to axis 22.

Figure 3:
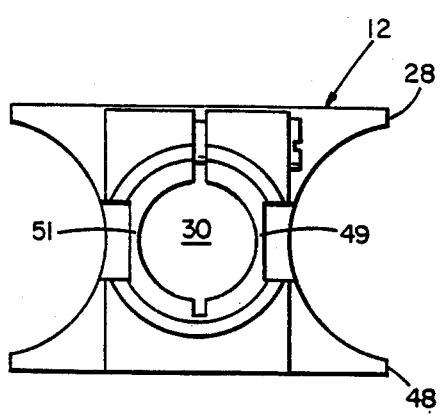
FIGS. 3 and 4 are an end view and a side view, respectively, of the mount of FIG. 2.
Figure 4:
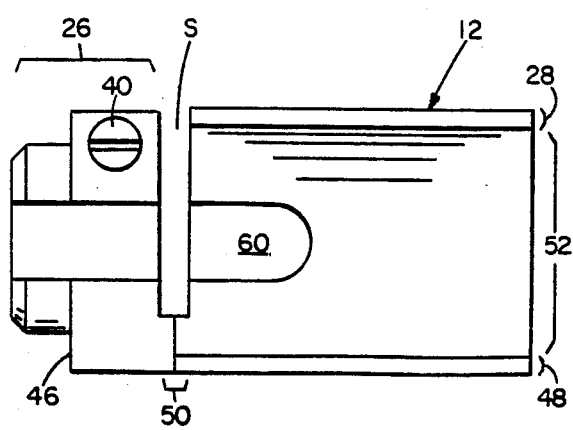
Figure 2:
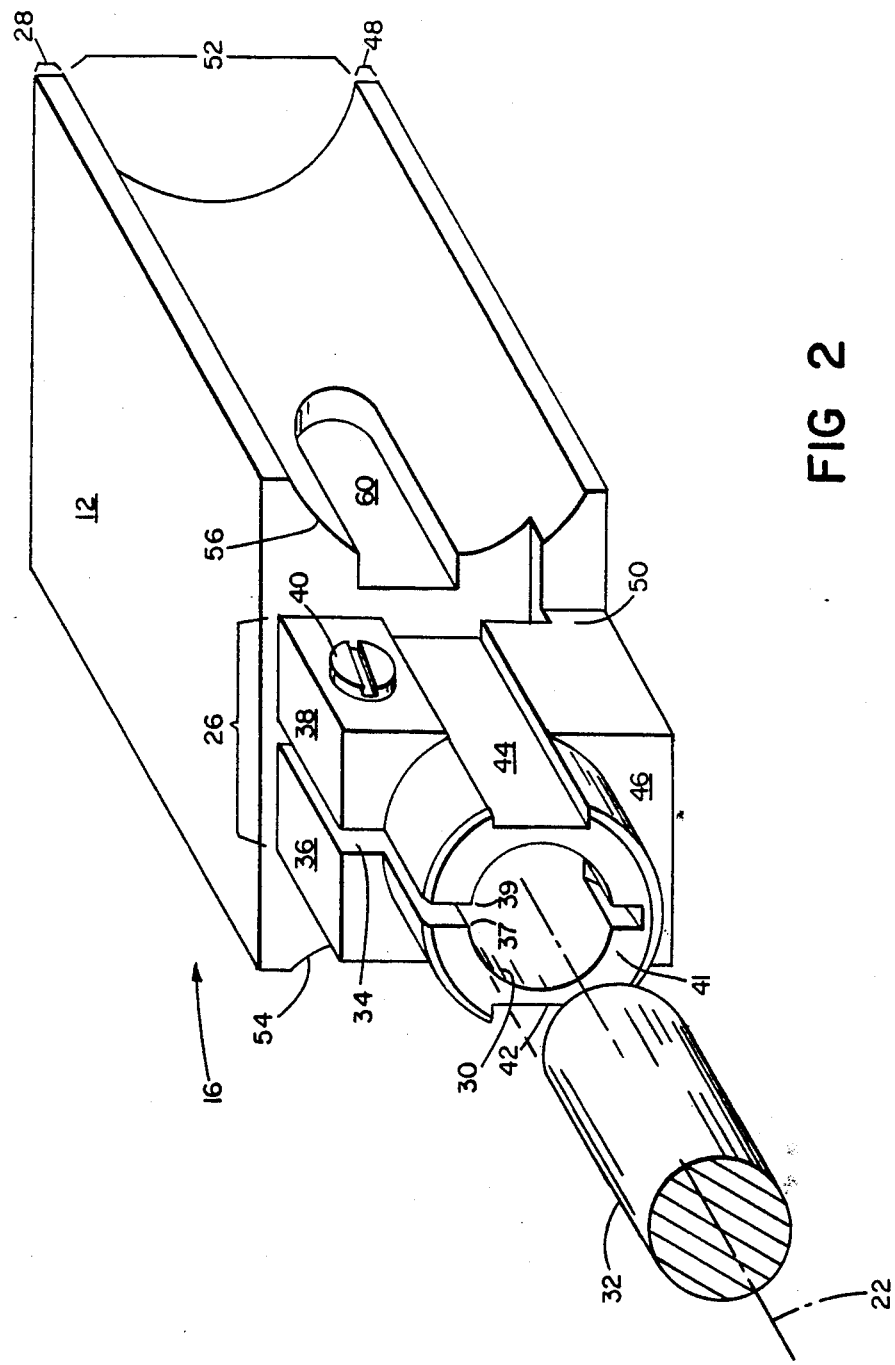
FIG. 2 is an isometric view of a preferred embodiment of the mirror mount of FIG. 1.

Referring to FIGS. 2, 3, 4, mount 16 is machined from an integral piece of aluminum (type 6061T6) to include a clamp 26 at one end and a mirrored portion 28 at the other end. Mirrored portion 28 is sufficiently rigid to prevent dynamic distortion of mirror surface 12. The clamp and the mirrored portion are connected by a strain decoupling means consisting of a necked down portion 50, a backbone 48, and a cutaway region 52.

Clamp 26 has a 0.1880 inch hole 30 for receiving a galvanometer shaft 32 having a shaft diameter slightly smaller than hole 30, thus providing a mounting tolerance. Hole 30 is centered on axis 22 and extends through mirrored portion 28. A 0.032 inch wide split 34 in clamp 26 defines a pair of ears 36, 38. Ears 36, 38 can be drawn together (by mechanical distortion of the clamp), tending to close split 34, to tighten clamp 26 on shaft 32. A clear hole in ear 38 and a tapped hole in ear 36 cooperate with a screw 40 to enable clamp 26 to be tightened. Relieved regions 42, 44 (each 0.125 inch high) on either side of clamp 26 respectively aid in isolating distortion in ears 36, 38 from being transmitted to a base 46 of clamp 26. At the same time, the edges 37, 39 of ears 36, 38 force shaft 32 against an alignment surface 41 of hole 30 to assure proper alignment between mirror surface 12 and axis 22. Alignment surface 41 is backed by a rigid non-deformable portion of clamp 26. At their thinnest places, regions 42, 44 are 0.017 inch thick.

Clamp 26 is connected to mirrored portion 28 by a necked-down portion 50 (0.103 inch thick) of reduced cross-sectional area, which joins base 46 of the clamp to backbone 48. Thus, the main body of the clamp is separated from the mirrored portion by a space S of 0.050 inch (FIG. 4). Necked-down portion 50 is at least as wide as clamp base 46 in order to faithfully transmit rotations of clamp 26 into rotations of mirrored portion 28 with a minimum of whiplash about axis 22.

Backbone 48 is separated from mirror portion 28 by a cutaway portion 52. Cutaway portion 52 has two semi-cylindrical cuts 54, 56 (radius 0.188 inch) on opposite sides of element 28 and two relieved regions 58, 60 which are extensions of and formed at the same time as regions 42, 44. Cutaway portion 52 is narrower (i.e., of smaller cross-sectional area) than mirror surface 12. As shown in FIG. 3, because hole 30 extends alongside mirrored portion 28, mirror surface 12 is connected to base 48 only via two narrow walls 49, 51.

Mirror surface 12 (0.625 inches by 0.575 inches) is machined and the whole mount is heat treated, then surface 12 is finished until the overall thickness of the element 28 is 0.436±0.005 inch. (Note that the thickness of necked-down portion 50 is smaller than the thickness of mirrored portion 28 and backbone 48.) A mirror is then replicated (by conventional replication technigues) or diamond machined on surface 12. Mirror surface 12 is parallel to but spaced apart from axis 22.

Because of its length perpendicular to axis 22, necked down portion 50 transmits motion of the shaft 32 faithfully to mirrored portion 28. The mass of mount 16 is balanced with respect to axis 22.

OPERATION

When clamp 26 is tightened onto shaft 32 ears 36, 38 bend around the shaft so that edges 37, 39 force shaft 32 against surface 41 to hold the shaft tightly with mirror surface 12 and shaft 32 in alignment. A considerable portion of the resulting bending stresses in the clamp are concentrated in relieved regions 42, 44 and any bending strains transmitted to region 46 are limited by the yield point of relieved regions 42, 44. Necked-down portion 50 reduces the transmission of any bending stresses from clamp base 46 axially to backbone 48 and cutaway portion 52 reduces the transmission of any residual bending stresses from backbone 48 to mirrored portion 28. Thus, mirror surface 12 remains flat to high accuracy notwithstanding the bending stresses caused by tightening screw 40. As a result the reflected beam 14 remains undistorted.

Figure 6:
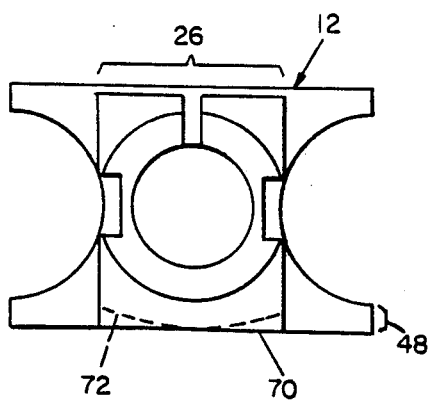
FIGS. 6, 7 are end views of respectively the mount of FIG. 2, and the mirrored portion of the mount illustrating stresses and strains.

For example, referring to FIG. 6, any tendency of clamp 26 to be distorted such that face 70 is bowed toward a contour suggested by dashed line 72 is transmitted axially but only with reduced magnitude into a distortion of backbone 48 because necked down portion 50 only connects face 70 to backbone 48 along a relatively small connecting area.

Figure 7:
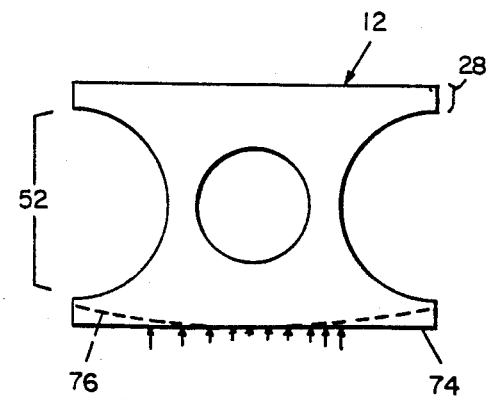

Similarly, referring to FIG. 7, any stress gradient applied via necked down portion 50 along backbone 48 (indicated by arrows) and which tends to cause the bottom face 74 to be strained to the bowed position of dashed line 76 will not, because of cutaway portion 52, cause surface 12 to bow in the same way.

Thus distortion of clamp 26 is not converted into a strain gradient at surface 12. The necked down and cutaway regions axially and radially decouple strains produced at the clamp from reaching surface 12 which would otherwise result from monolithic behavior of a non-necked, non-cutaway mount.

The mount can be easily and securely attached in proper alignment to the shaft without imposing mechanical distortion on the mirror. The mirror surface can be finished easily because it is offset from the axis. The mount is balanced to reduce inaccuracies of motion. Rotation of the shaft is accurately transmitted to the mirror.

Other embodiments are within the following claims.

Figure 5:
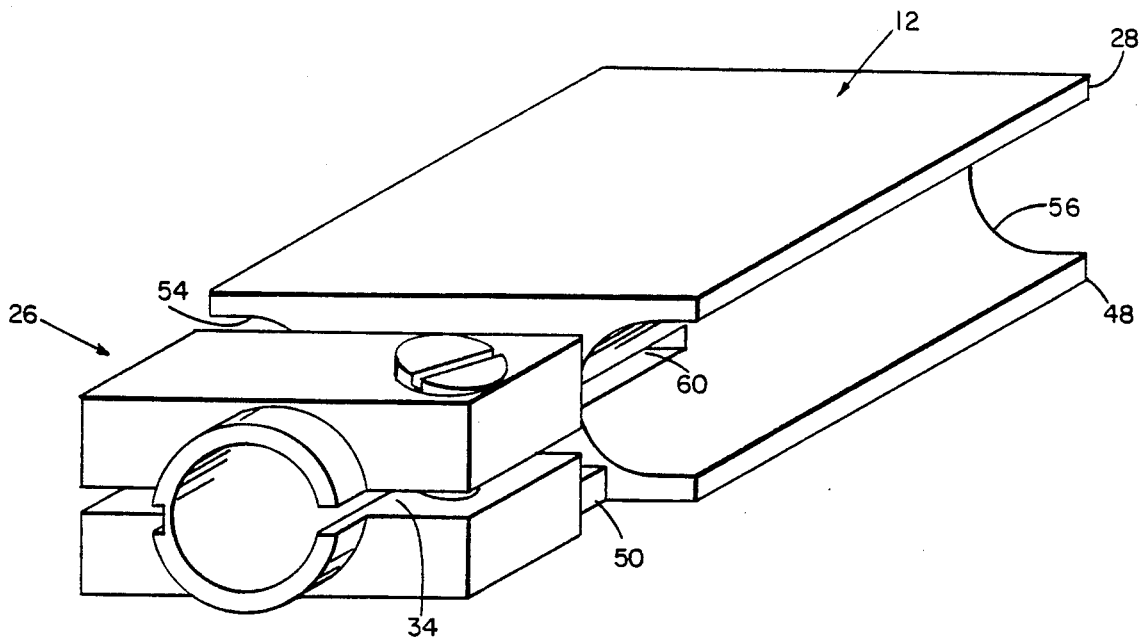
FIG. 5 is an isometric view of another embodiment.

For example, referring to FIG. 5, in another embodiment the thickness between mirror surface 12 and the bottom of backbone 48 is 0.250 inch thick; cuts 54, 56 have a 0.0935 inch radius, relieved regions 58, 60 are 0.031 inch high; split 34 is oriented parallel to surface 12, and necked down portion 50 is relieved both in width and height compared with clamp 26.

Figure 8:
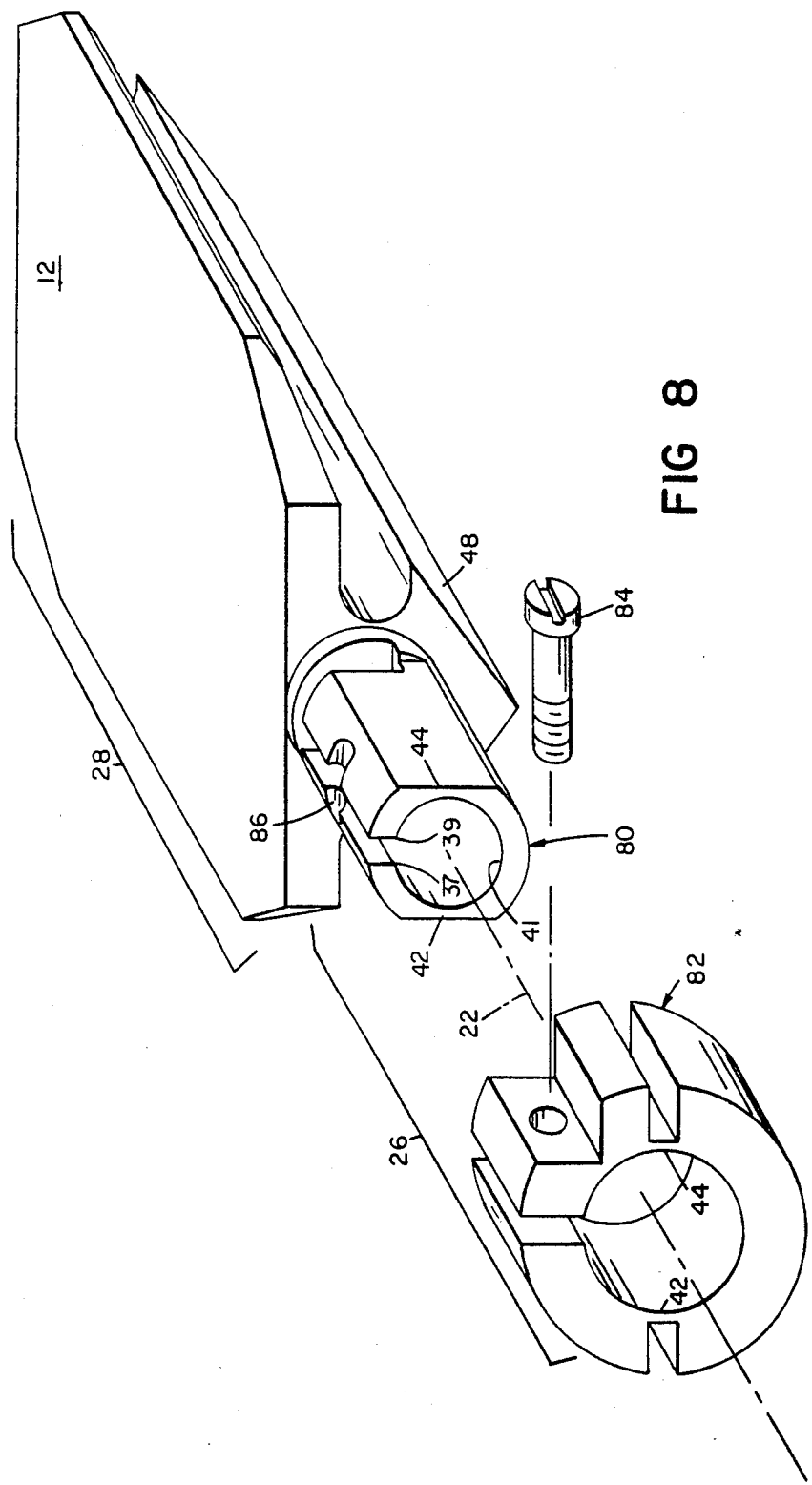

Referring to FIG. 8, in another embodiment, backbone 48 is prism shaped and sized to balance the mass about axis 22. Clamp 26 includes two elements, a central sleeve 80 (formed integrally with backbone 48) and a surrounding collet 82. Collet 82 holds a setscrew 84 that keys into a slot 86 on sleeve 80. Both sleeve 80 and collet 82 have cooperating relieved regions 42, 44.

Referring to FIG. 9, in another embodiment, the sleeve has two eccentric surfaces 90, 92. Surface 90 is semi-cylindrical, centered on axis 22, and is arranged to receive shaft 32. Surface 92 is semi-cylindrical, centered on a different axis 96 and is arranged to be surrounded by an inner wall 98 of the collet, also centered on axis 96. Inner wall 98 also defines two edges 100, 102. The collet includes relieved regions 104, 106. The masses of the collet and sleeve are offset to provide balance about axis 22. To mount the mirror, the collet is slipped easily over the sleeve and the shaft is inserted to rest against the surface 90. As setscrew 84 is tightened, edges 100, 102 force shaft 32 against surface 90, and wall 92 against wall 98. The collet also has an outer wall 108, centered on axis 22 so that together the mass of the collet and the mass of the sleeve are balanced about axis 22.

The mirror surface can be a shape other than rectangular, such as round. Optical elements other than mirrors, such as lenses, can be substituted.

I claim:

1. A mount for attaching an optical element to a rotating shaft with the optical element in a desired orientation with respect to an axis of said shaft and with respect to a beam impinging on said optical element, comprising
   a first portion which bears said optical element and is sufficiently rigid to limit dynamic distortion of said optical element,
   a clamp portion spaced axially from said first portion for clamping said mount to said shaft, using a force which causes mechanical distortion in said clamp portion, and
   a strain decoupling means connecting said first portion to said clamp portion, said strain decoupling means being configured to transmit rotation of said shaft faithfully to said optical element, while isolating said mechanical distortion in said clamp portion from being transmitted axially to said first portion.

2. The mount of claim 1 wherein said strain decoupling means comprises necked-down regions that have smaller cross-sectional area than said first portion and said clamp portion.

3. The mount of claim 1 wherein
   said clamp portion comprises a bore for fitting over said shaft, said clamp portion having a configuration for gripping said shaft by mechanical distortion of said clamp portion.

4. The mount of claim 3 wherein
   said clamp portion comprises
   a clamp base,
   a pair of spaced apart ears which can be drawn together to impart said mechanical distortion, and
   a relieved area for decoupling said mechanical distortion from said clamp base,
   said strain decoupling means connecting only said clamp base to said first portion.

5. The mount of claim 3 wherein
   said bore is larger than said shaft, said bore is split and defines a pair of edges on one side of axis and an alignment surface on the opposite side of said axis, and said mechanical distortion causes said edges to force said shaft against said alignment surface to achieve alignment of said shaft relative to said optical element.

6. The mount of claim 3 wherein
   said clamp portion comprises
   a sleeve that defines said bore, and
   a collet comprising a bore for fitting over said sleeve, said sleeve and said bore having configurations for gripping said shaft by mechanical distortion of said sleeve and said collet.

7. The mount of claim 6 wherein
   said sleeve comprises a sleeve base, a pair of spaced apart sleeve ears which can be drawn together to impart said mechanical distortion, and a relieved sleeve area, and
   said collet comprises a collet base, a pair of spaced apart collet ears which can be drawn together to impart said mechanical distortion, and a relieved collet area,
   and wherein said relieved collet and sleeve areas cooperate to decouple said mechanical distortion from said strain decoupling means.

8. The mount of claim 6 wherein
   said sleeve is defined by an inner wall for gripping said shaft and an outer wall, eccentric to said inner wall, and
   said collet comprises an inner wall for engagement with said outer wall of said sleeve.

9. The mount of claim 8 wherein
   said collet is split to define a pair of edges on one side of said axis, and
   said sleeve inner wall defines an alignment surface on the other side of said axis, whereby said mechanical distortion causes said edges to force said shaft against said alignment surface.

10. The mount of claim 8 wherein
    said collet comprises a relieved area for decoupling said mechanical distortion from said strain decoupling means.

11. The mount of claim 8 wherein the center of mass of said sleeve is offset from said axis, the center of mass of said collet is offset from said axis, and the masses of said collet and sleeve and the positions of said center of masses are balanced about said axis.

12. The mount of claim 1 wherein
    said strain decoupling means includes
    a backbone spaced radially from said first portion, and
    a cutaway portion for connecting said backbone to said first portion, said cutaway portion being of smaller cross-section than said optical element.

13. The mount of claim 1 wherein said optical element is in a plane parallel to but spaced apart from said axis.

14. The mount of claim 1 wherein said optical element is a planar mirror.

15. The mount of claim 1 wherein said first portion, said clamp portion, and said strain decoupling means are configured to balance said mount with respect to said axis.

16. The mount of claim 1 wherein said first portion, said clamp portion, said strain decoupling means, and said element are integrally formed.

17. The mount of claim 1 wherein said first portion is balanced with respect to said axis.

* * * * *